Figure 1:
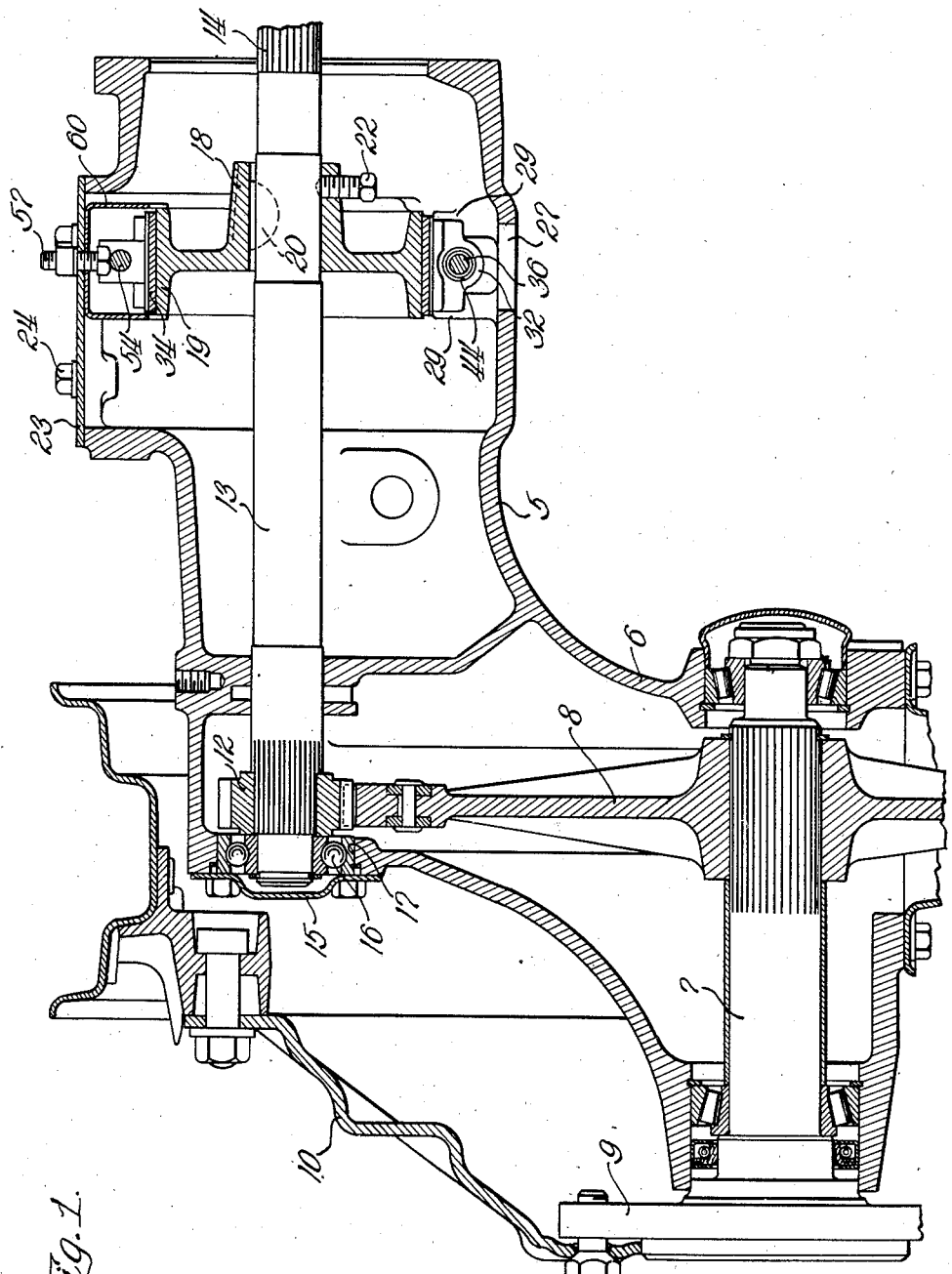

Feb. 10, 1948.  J. BORLAND  2,435,867
FLOATING EXTERNAL CONTRACTING BRAKE CONSTRUCTION
Filed July 25, 1945  2 Sheets-Sheet 1

INVENTOR.
John Borland
BY Walter E. Schirmer
Atty.

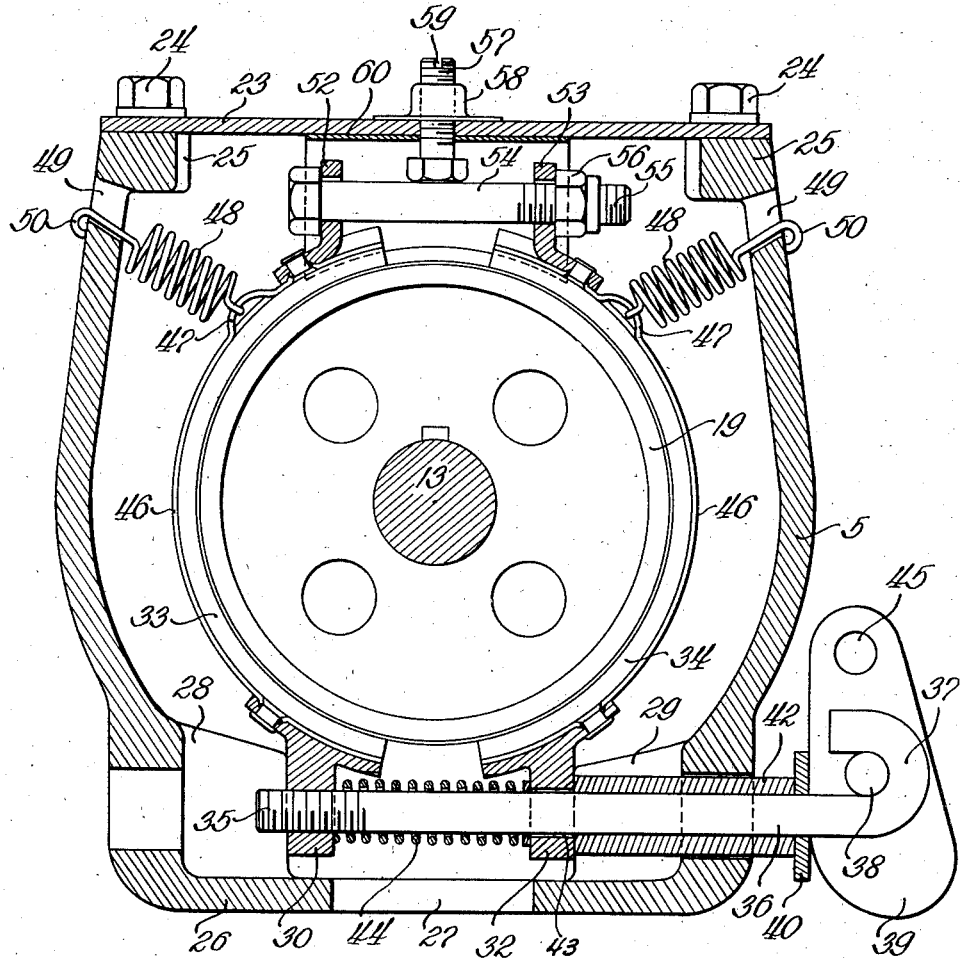

Patented Feb. 10, 1948

2,435,867

UNITED STATES PATENT OFFICE 2,435,867

FLOATING EXTERNAL CONTRACTING BRAKE CONSTRUCTION

John Borland, Buchanan, Mich., assignor to Clark Equipment Company, Buchanan, Mich., a corporation of Michigan Application July 25, 1945, Serial No. 606,925

11 Claims. (Cl. 188—75)

This invention relates to brakes, and more particularly is concerned with a brake construction for application of braking torque to the drive shaft of a vehicle such as a tractor or the like wherein the braking torque is used both for stopping the vehicle and also as a means of steering the same.

While the invention has been disclosed in connection with a particular type of axle drive for tractors, it is to be understood that the construction may be used in other applications and, consequently, the invention should not be limited to the particular installation used for purposes of disclosure.

One of the primary objects of the present invention is to provide a brake construction which is of the floating type and which will operate effectively in either direction of rotation of the brake drum.

Another object of the invention is to provide a brake construction which is of simple design and in which the brake shoes are not anchored but are free to float and assume the desired braking position.

A still further object of the present invention is to provide a brake construction in which simplified means is employed for holding the brake in opened position so that it does not rest upon the brake drum when not in operation.

A still further advantage of the present construction is a simplified means for adjustment of the brake occasioned by wear and also the provision of a novel type of supporting means for the floating end of the brake shoes.

Other objects and advantages of the present invention will appear more fully from the following detail description which, taken in conjunction with the accompanying drawings, will disclose to those skilled in the art a particular construction and operation of a preferred form of the present invention.

In the drawings:

Figure 1 is a sectional view through an axle construction embodying the present form of brake; and Figure 2 is a transverse sectional view through the brake construction shown in Figure 1.

Considering the drawings in detail, there is indicated a unitary axle housing 5 in Figure 1, which housing has the depending portion 6 adapted to provide journal supports for a shaft 7 upon which is mounted the bull gear 8 and the wheel flange 9 to which is secured the wheel 10. The bull gear 8 is adapted to be driven from the pinion 12 carried by drive shaft 13 which, at its opposite end, is splined as indicated at 14 for extension into one side gear of a differential gear assembly. A suitable cover plate 15 is provided for allowing withdrawal of the bearings 16, pinion 12, and drive shaft 13 through the opening 17 when the bearing cap is removed, thereby allowing removal of the drive shaft without disassembly of the housing from the differential housing of the axle.

Mounted on the drive shaft 13 adjacent the splined end 14 thereof is the hub 18 of a brake drum 19. The hub 18 is secured against rotation relative the shaft 13 by means of the key 20 and is held against axial movement by means of the set screw 22. The drum may be assembled into the housing 5 through a cover plate 23 bolted or otherwise secured by means of studs 24 to suitable bosses 25 formed at the upper end of the housing 5, or may be inserted endwise into the housing conjointly with the shaft. The housing 5 below the drum 19 is provided with a thickened base portion 26 having a central opening 27 therein, the base portion 26 being provided also with boss portions 28 and 29 which are spaced apart to provide a central channel therethrough into which depends the lug portions 30 and 32 secured to the lower ends of brake shoes 33 and 34. The lug portion 30 of shoe 33 is threaded to receive the threaded end 35 of a J-bolt 36 which has its end 37 turned around a pivot pin 38 carried by the cam member 39. The cam member 39 in turn rests against a thrust disc 40 which bears against a sliding sleeve 42 slidably receiving the J-bolt 36 and bearing at its opposite end against the lug 32. The lug 32 is provided with a suitable clearance opening 43 through which the J-bolt extends for sliding movement, and a suitable coil spring 44 is disposed between the lugs 30 and 32 to normally maintain them in spaced relation against the adjacent bosses 28 and 29. These bosses are also channeled transversely to allow free movement of the sleeve 42 and J-bolt 35 therethrough when the cam member 39 is rotated.

To effect rotation of the cam member 39, any suitable actuating member may be secured in the eye 45 thereof so that when the upper end of the cam member is pulled toward the right as viewed in Figure 2, a resultant equalizing action is produced between J-bolt 35 and sleeve 42 on lug 32, tending to compress the spring 44 and thereby engage the shoes 33 and 34 about the external surface of the drum 19. The shoes 33 and 34 are provided with metal bracket strips 46 which, adjacent their upper ends, have raised portions 47 forming eyes for receiving one end of a pair of similar springs 48, the opposite end of these springs being extended out through openings 49 in the side walls of the housing 5 and being hooked as shown at 50 beyond the side walls to provide an anchor for the outer ends of the springs. The purpose of these springs is to hold the brake shoes 33 and 34 out of contact with the brake drum 19 until such time as the cam member 39 is actuated.

The opposite ends of the brake shoes 33 and 34 are provided with lugs 52 and 53, respectively, through which extends an adjusting bolt 54 having a threaded end 55 receiving the adjusting nut 56 thereon. This provides a floating adjustment for the ends of the shoes opposite the lugs 30 and 32, and it will be noted that the adjusting bolt 54 is held against upward movement by means of an adjustable stud 57 threaded through a boss member 58, welded or otherwise secured to the outside surface of the cover plate 23, with its head end bearing against the upper surface of the adjusting bolt 54. A suitable slot 59 provides for adjustment of the stud 57 to in turn determine the location in a vertical plane of the bolt 54. A suitable shield member 60 of inverted U-shape, as shown in Figure 1, forms a side retainer for the brake assembly to prevent it from moving out of alignment with the drum 19.

It will thus be apparent that with the present construction actuation of the cam member 39 will result in drawing the lugs 30 and 32 toward each other. As they grip the surface of the drum 19 and tend to rotate therewith, either one or the other of the lugs will engage the abutments 28 or 29, depending upon the direction of rotation, forming a positive stop which will provide for application of the brakes to apply braking torque to the shaft 13. Since the opposite ends of the brake shoes are floating, it will be apparent that the braking torque applied to one of the shoes as it hits the lower abutment will be transmitted to the other shoe through the tension exerted by the lugs 52 on the bolt 54, consequently gripping the other shoe firmly around the drum surface. This will occur regardless of the direction of rotation of the drum. Thus, a very simple type of brake shoe construction and support is provided, capable of ready adjustment, and which may be easily assembled into position within the housing 5 through the cover plate 23, the springs 48 being readily insertable through the cover plate and having resilient attachment to the eyes 47 and to the walls of the housing to provide proper floating support of the shoes when not in engaged position. Also, any foreign matter which may enter through openings 49 will be readily discharged through the lower opening 27 of the housing so that it cannot be retained within the housing. Furthermore, the novel arrangement of the stud 57 insures proper rotating of the adjusting bolt 54 and the associated shoes within the construction, and provides a vertical stop for preventing the springs 48 from raising the shoes to a point where the lower ends thereof might engage the drum in unenergized position.

Therefore, it is believed apparent that I have provided a novel type of simplified brake construction which is equally effective in either direction of rotation and which is capable of ready assembly within an axle housing of the type used on farm tractors and the like. I do not intend to be limited to the exact details herein shown and described, but only insofar as defined by the scope and spirit of the appended claims.

I claim:
1. A shaft brake construction including a drum mounted on said shaft, a pair of arcuate brake shoes surrounding said drum, floating adjustment means coupling adjacent ends of said shoes together, means for maintaining said shoes radially in line with said drum, projecting lugs on the opposite ends of said shoes, an enclosing housing including opposed bosses forming abutments for said lugs, spring means for maintaining said lugs against said abutment and bolt means extending through said lugs for contracting said shoes about said drum.

2. In an axle housing, a shaft, a brake drum secured thereon, a pair of arcuate brake shoes surrounding said drum, adjustment means coupling adjacent ends of said shoes together and having limited floating movement in said housing, spring means holding said shoes out of engagement with said drum, projecting lugs on the opposite ends of said shoes, opposed bosses in said housing forming abutments limiting rotated movement of said lugs in opposite directions, and actuating means engaging said lugs for contracting the shoes about said drum.

3. The brake construction of claim 2 including spring means between said lugs tending to hold them against said abutments.

4. In combination, a shaft having a brake drum thereon, a housing surrounding said drum, a pair of arcuate brake shoes encircling said drum and having projecting lugs at opposite ends thereof, an adjusting bolt connecting one pair of lugs at adjacent ends of said shoes, individual springs secured to each shoe and anchored in said housing holding said shoes against resting on said drum, an adjustable stop limiting vertical movement of said bolt under action of said springs, opposed bosses carried by said housing forming abutments for the other pair of lugs at the opposite ends of said shoes, and actuating means engaging said last-named pair of lugs for contracting said shoes about said drum.

5. The combination of claim 4 including means laterally alining said shoes with said drum.

6. The combination of claim 4 including spring means between said last-named pair of lugs normally spreading them into engagement with said abutments.

7. The combination of claim 4 wherein said actuating means comprises a bolt engaging one of said last-named pair of lugs and extending through the other associated lug, a sleeve surrounding said bolt and bearing against said associated lug, and cam means for jointly moving said bolt and sleeve in opposite directions to move said lugs toward each other.

8. In combination, a shaft having a brake drum thereon, a housing enclosing said shaft and drum, a pair of arcuate brake shoes resiliently suspended from said housing about said drum, floating adjustment means between the adjacent upper ends of said shoes, projecting lugs at the opposite ends of said shoes, a pair of opposed bosses carried by said housing forming abutments for said lugs, and actuating means for urging said lugs toward each other to contract said shoes about said drum, one of said lugs engaging its associated abutment to prevent rotation of said shoes and to transmit braking action from the associated shoe through said adjustment means to the other shoe.

9. The combination of claim 8 including an adjustable vertical stop for said adjustment means.

10. The combination of claim 8 including spring means normally spreading said lugs into engagement with said bosses.

11. In combination, a shaft having a brake drum thereon, a pair of arcuate brake shoes encircling said drum and having lugs at the ends thereof, floating adjustment means engaging the lugs at adjacent ends of said shoes, spring means between the opposed lugs at the opposite ends of said shoes, fixed abutment means engaged by said opposed lugs, means for contracting said shoes about said drum against the pressure of said spring means, and springs individually engaging each of said shoes to hold them normally out of engagement with said drum.

JOHN BORLAND.

REFERENCES CITED

The following references are of record in the file of this patent:

UNITED STATES PATENTS

| Number | Name | Date |
|---|---|---|
| 1,347,990 | Carter | July 27, 1920 |
| 1,614,742 | Heyser | Jan. 18, 1927 |
| 1,051,928 | Tuttle | Feb. 4, 1913 |
| 910,435 | Thompson | Jan. 19, 1909 |
| 817,678 | Smith | Apr. 10, 1906 |
| 1,644,707 | Blackmore | Oct. 11, 1927 |
| 1,383,385 | Brown | July 5, 1921 |
| 1,578,459 | Miller et al. | Mar. 30, 1926 |